United States Patent [19]
Mori et al.

[11] Patent Number: 4,781,218
[45] Date of Patent: Nov. 1, 1988

[54] VALVE ASSEMBLY FOR USE IN A FUEL TANK OF A VEHICLE

[75] Inventors: Eiji Mori, Okazaki; Hitoshi Ohkubo, Toyota, both of Japan

[73] Assignee: Toyota Jidosha Kabushiki Kaisha, Aichi, Japan

[21] Appl. No.: 149,947

[22] Filed: Jan. 29, 1988

Related U.S. Application Data

[63] Continuation of Ser. No. 932,500, Nov. 20, 1986, abandoned.

[30] Foreign Application Priority Data

| Nov. 29, 1985 | [JP] | Japan | 60-184959[U] |
| Jun. 26, 1986 | [JP] | Japan | 61-97893[U] |
| Jul. 1, 1986 | [JP] | Japan | 61-100998[U] |

[51] Int. Cl.⁴ .......... F16K 17/196; F16K 24/04; B01D 45/08
[52] U.S. Cl. ............ 137/202; 55/385 B; 55/385 C; 55/463; 55/464; 137/493.8
[58] Field of Search ........ 137/493.8, 43, 493, 137/493.1, 493.2, 493.3, 493.4, 493.7, 493.9, 493.5, 493.6, 202; 55/461, 462, 463, 464, 465, 385 B, 385 C

[56] References Cited

U.S. PATENT DOCUMENTS

| 2,183,709 | 12/1939 | Deming | 137/493.9 X |
| 2,509,505 | 5/1950 | Johnson | 55/462 X |
| 2,521,201 | 9/1950 | Clark et al. | 137/493.7 X |
| 2,544,820 | 3/1951 | Baker et al. | |
| 3,187,935 | 6/1965 | Lense | |
| 3,548,847 | 12/1970 | Roven | |
| 4,041,569 | 8/1977 | Peterson | 55/462 X |
| 4,095,609 | 6/1978 | Martin | 137/43 |
| 4,351,350 | 9/1982 | Crute | 137/43 X |
| 4,555,041 | 11/1985 | Muehl | 137/493.3 X |
| 4,570,657 | 2/1986 | Rogers | 137/493 |
| 4,646,772 | 3/1987 | Bergsma | 137/43 X |

FOREIGN PATENT DOCUMENTS

| 2019082 | 11/1970 | Fed. Rep. of Germany . |
| 1118613 | 6/1956 | France | 137/493.8 |
| 21084 | 6/1973 | Japan . |
| 51-21084 | 6/1976 | Japan . |
| 60-119649 | 8/1985 | Japan . |
| 60-137626 | 9/1985 | Japan . |
| 95418 | 4/1939 | Sweden . |
| 1236188 | 6/1971 | United Kingdom . |
| 1334424 | 10/1973 | United Kingdom . |

Primary Examiner—Martin P. Schwadron
Assistant Examiner—Stephen M. Hepperle
Attorney, Agent, or Firm—Parkhurst, Oliff & Berridge

[57] ABSTRACT

A valve assembly for use in a fuel tank of a vehicle which includes a first valve mechanism and a dust preventing member. The valve assembly is secured to the fuel tank and the valve assembly allows selective communication between the inside of the fuel tank and the outside of the fuel tank. The first valve mechanism includes a valve casing and a valve body. When the valve body is positioned at a first position, the valve body is positioned apart from an aperture of the valve casing. As a result, the valve assembly allows the communication between the inside of the fuel tank and the outside of the fuel tank through the aperture of the valve casing. On the other hand, when the valve body is positioned at a second position, the valve body covers the aperture of the valve casing. As a result, the valve assembly prevents communication between the inside of the fuel tank and the outside of the fuel tank. A dust preventing member is secured to an outer surface of the valve casing and includes a wall member. Accordingly, substantially all of minute dust particles and water vapor in the air flow are forced down by the wall member of the dust preventing means. Therefore, the dust preventing means substantially prevents the introduction of minute dust particles and water vapor into the fuel tank.

12 Claims, 15 Drawing Sheets

VALVE ASSEMBLY FOR USE IN A FUEL TANK OF A VEHICLE

This is a continuation of application Ser. No. 932,500 filed Nov. 20, 1986, now abandoned.

BACKGROUND OF THE INVENTION

The present invention relates to a valve assembly for use in a vehicle. More particularly, the present invention relates to improvements in a fuel cut off valve which can selectively cut off communication between the inside of a fuel tank and the atmosphere.

A similar fuel cut off valve is disclosed in Japanese Patent Publication No. Sho 51-21084. This publication discloses a fuel cut off valve which includes a plurality of float valves and a pair of check valves. The plurality of float valves are connected to the pair of check valves through a plurality of pipes. The plurality of float valves are located apart from each other within a fuel tank. The pair of check valves are located on an outer surface of the fuel tank. Accordingly, the inside of the fuel tank communicates with the atmosphere through the plurality of float valves, the plurality of pipes and the pair of check valves. Even when the fuel tank of a vehicle is inclined and one of the plurality of float valves is closed, the inside of the fuel tank communicates with the atmosphere through at least one of the plurality of float valves, at least one of the plurality of pipes and the pair of check valves.

Further, when the inner pressure of the fuel tank is too high one of the check valves releases the high pressure from the inside of the fuel tank. On the other hand, when the inner pressure of the fuel tank is too low another of the check valves introduces the atmosphere into the inside of the fuel tank.

The conventional fuel cut off valve does not however include a dust preventing means, thus when the one of the pair of check valves is opened to introduce the atmosphere into the fuel tank, minute dust particles and water vapor present in the atmosphere are introduced into the inside of the fuel tank.

As a result, the minute dust particles float within the fuel and water stands within the fuel tank.

SUMMARY OF THE INVENTION

The present invention was developed in view of the foregoing background and to overcome the foregoing drawbacks. It is accordingly an object of this invention to provide a valve assembly which can prevent minute dust particles and water vapor from being introduced into the inside of a fuel tank.

To achieve prevention of introduction of minute dust particles and water vapor, a valve assembly includes a first valve means and a dust preventing means. The valve assembly is secured to the fuel tank and the valve assembly allows selective communication between the inside of the fuel tank and the outside of the fuel tank. The first valve means includes a valve casing and a valve body. The valve body is located within and slidably mounted in the valve casing. The valve body is positioned selectively at one of a first position and a second position. The valve casing has at least an aperture to allow communication between the inside of the fuel tank and the outside of the fuel tank. When the valve body is positioned at the first position, the valve body is positioned apart from the aperture of the valve casing. As a result, the valve assembly can allow communication between the inside of the the fuel tank and the outside of the fuel tank through the aperture of the valve casing. On the other hand, when the valve body is positioned at the second position, the valve body covers the aperture of the valve casing. As a result, the valve assembly can block communication between the inside of the fuel tank and the outside of the fuel tank.

The dust preventing means is secured to an outer surface of the valve casing and includes a wall member. The wall member of the dust preventing means surrounds the aperture of the valve casing.

Accordingly, an air flow, from the outside of the fuel tank to the inside of the fuel tank, hits the wall member and is forced to travel around the wall member. Most of the minute dust particles and water vapor in the air flow is precipitated by the wall member of the dust preventing means. As a result, the dust preventing means allows air flow without minute dust particles and water vapor to communicate between the outside of the fuel tank and the inside of the fuel tank.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
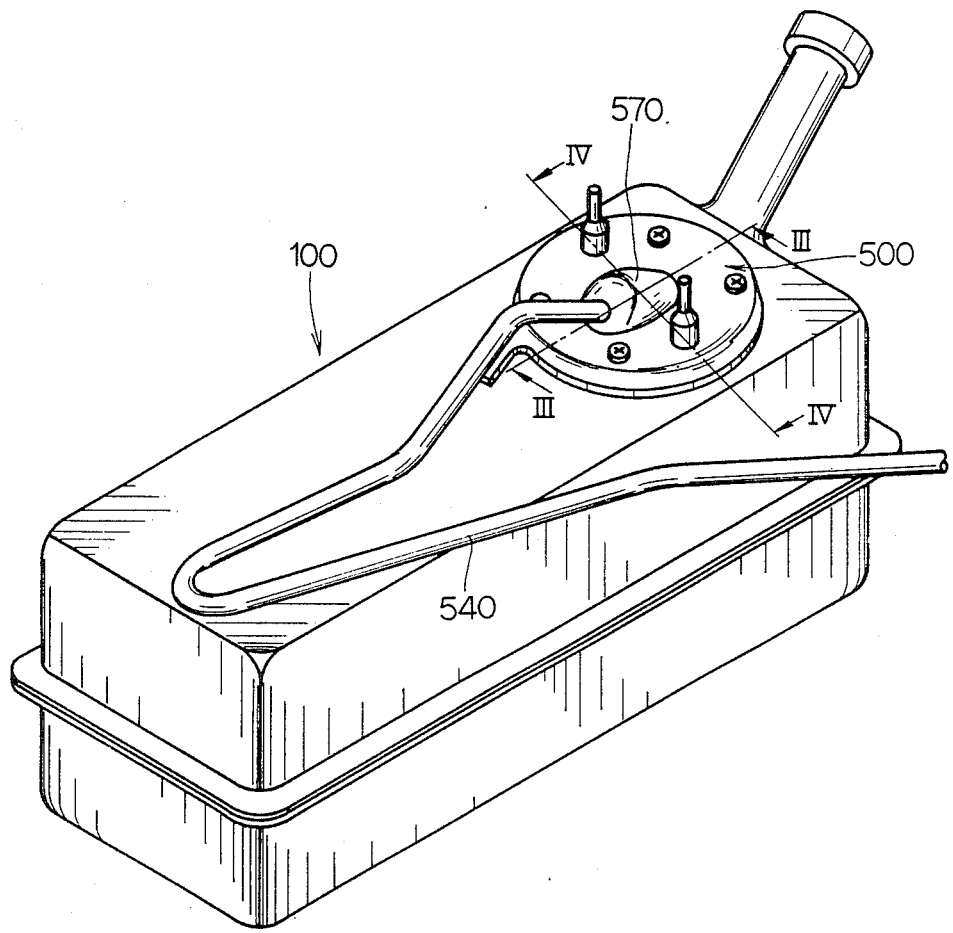
FIG. 1 is a perspective view of a fuel tank for use in a vehicle, wherein a fuel cut off valve assembly is assembled on the fuel tank.

Referring to FIG. 1, a fuel tank 100 is mounted on a vehicle (not shown in the drawings) and the inside of the fuel tank 100 communicates selectively with the atmosphere of the outside of the fuel tank 100 through a connecting pipe 540 and a charcoal canister (not shown in drawings). The charcoal canister is mounted on the vehicle.

Figure 2:
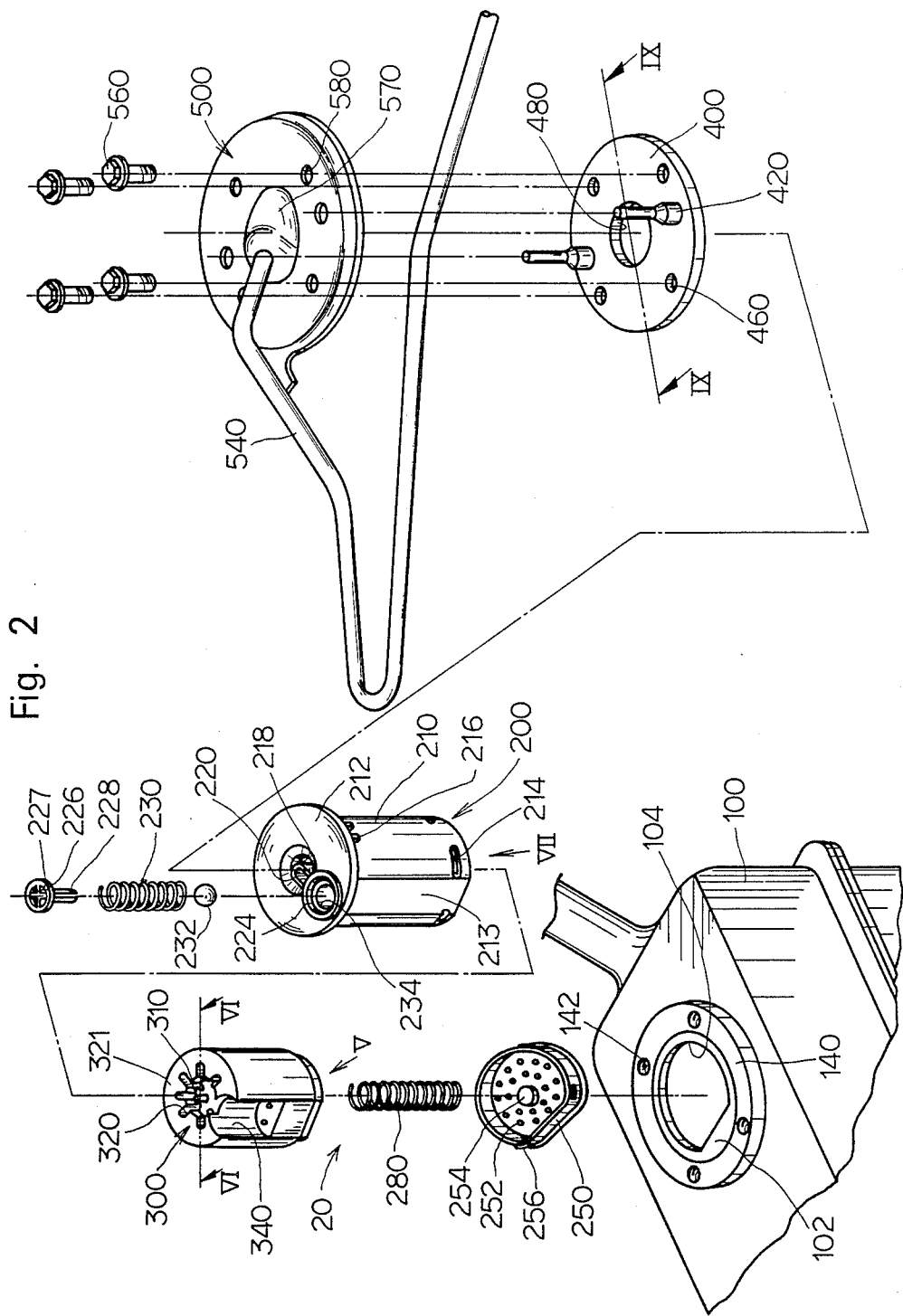
FIG. 2 is a perspective disassembled view of the fuel cut off valve assembly.
Figure 3:
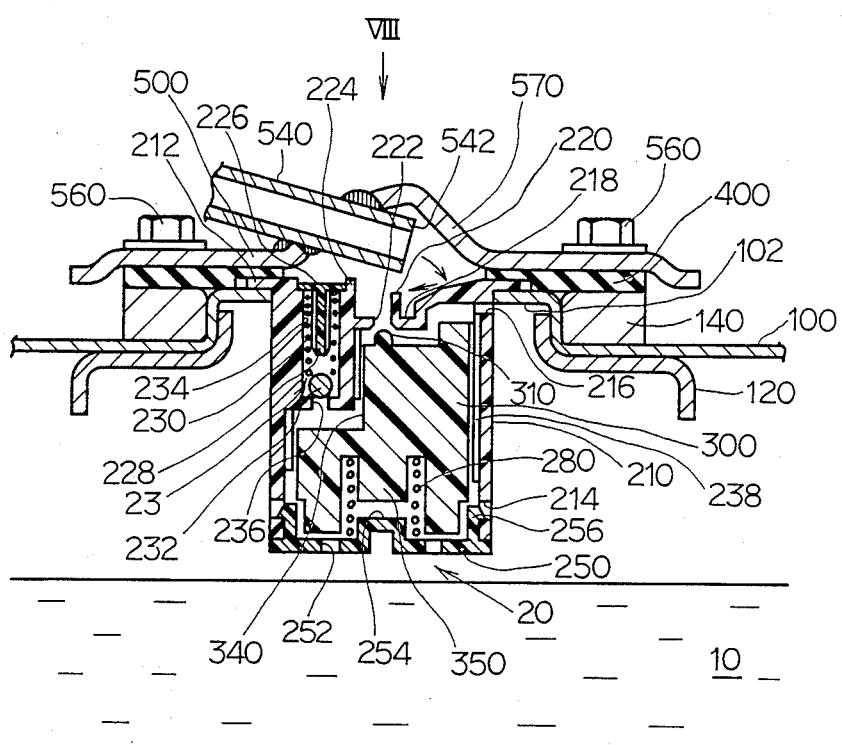
FIG. 3 is an enlarged cross-sectional view of the fuel cut off valve assembly taken along the line III—III in FIG. 1, wherein a valve body is positioned at a lower position and a check valve mechanism is closed.
Figure 4:
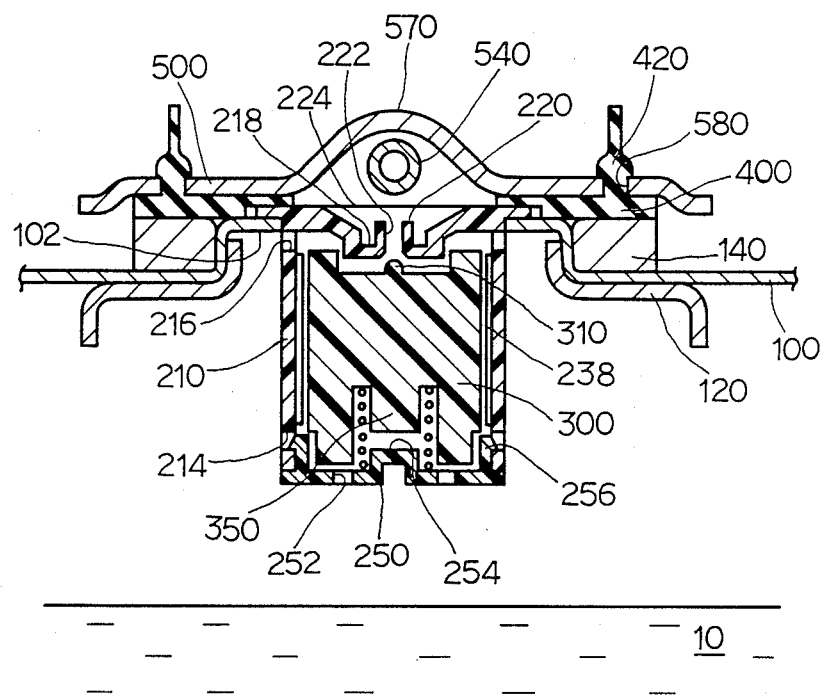
FIG. 4 is an enlarged cross-sectional view of the fuel cut off valve assembly taken along the line IV—IV in FIG. 1, wherein the valve body is positioned at the lower position.

As shown in FIG. 2, the connecting pipe 540 is secured to a lid 500 and the lid 500 includes a cap portion 570 at a center thereof and a plurality of first holes 580. The cap portion 570 defines an inner chamber on an under surface of the lid 500 and an end 542 of the connecting pipe 540 is located within the inner chamber as shown in FIG. 3. A seal means 400 is attached to a peripheral portion of the under surface of the lid 500 and the seal means 400 includes a pair of projections 420, a center opening 480 and a plurality of second holes 460. The pair of projections 420 extend upwardly from an upper surface of the seal means 400 and correspond to two of the plurality of first holes 580 of the lid 500. When the seal means 400 is assembled to the lid 500, the pair of projections 420 are inserted in the corresponding first holes 580 and further extend upwardly, as shown in FIG. 4. The plurality of second holes 460 of the seal means 400 correspond to the plurality of first holes 580 of the lid 500.

The fuel tank 100 includes a round projection 102 and the round projection 102 projects upwardly from the fuel tank 100. A ring member 140 is secured to the fuel tank 100 and the ring member 140 surrounds the round projection 102. The ring member 140 includes a plurality of third holes 142 on an upper surface thereof. The plurality of third holes 142 of the ring member 140 correspond to the plurality of second holes 460 of the seal member 400. Each of bolts 560 is inserted into the first and second hole 580 and 460 and screwed in a third holes 142. Thus the lid 500 is secured to the fuel tank 100 by the bolts 560 and the seal means 400 seals between the lid 500 and the fuel tank 100. The round projection 102 of the fuel tank 100 has an arch-shape opening 104 on a top surface thereof.

A valve assembly 20 is inserted into the fuel tank 100 through the arch-shape opening 104 of the round projection 102. The valve assembly 20 includes a valve casing 200 and a valve body 300.

The valve casing 200 includes an upper casing 210 and a bottom casing 250, and in an assembled condition, the valve body 300 and a first spring 280 are enclosed within the valve casing 200. The upper casing 210 includes a top plate 212 and an arch-shaped side wall 213. A plurality of communicating apertures 216 are defined in the vicinity of the top plate 212 on the arch-shape side wall 213 and a plurality of securing apertures 214 are defined in the vicinity of a bottom end of the arch-shape side wall 213. The top plate 212 includes a peripheral edge which is mounted on the top surface of the round projection 102 of the fuel tank 100.

The bottom casing 250 includes a plurality of securing projections 256, a center projection 254 and a plurality of communicating apertures 252. When the bottom casing 250 is assembled to the upper casing 210, the securing projections 256 are inserted into the securing apertures 214, such that the bottom casing 250 is secured to the upper casing 210. In the assembled condition, a bottom end of the first spring 280 surrounds the center projection 254 of the bottom casing 250.

The top plate 212 includes a dust preventing walls 220 and 224, a groove 218, and a cylinder portion 234. The cylinder portion 234 is defined within the upper casing 210. The dust preventing walls 220 and 224 are secured to the top plate 212 of the upper casing 210 and extend upwardly. In the assembled condition, a valve-ball 232, a second spring 230 and a valve-lid 226 are inserted into the cylinder portion 234 of the upper casing 210. The valve-lid 226 includes a plurality of apertures 227 and a projection 228. The plurality of apertures 227 of the valve-lid 226 allow communication between the inside of the cylinder portion 234 and the outside of the upper casing 210, and the projection 228 of the valve-lid 226 extends downwardly from the valve-lid 226. In the assembled condition, the second spring 230 surrounds the projection 228 of the valve-lid 226.

As shown in FIGS. 3 and 4, normally, the valve-ball 232 is positioned apart from the projection 228 of the valve-lid 226, because the valve ball 232 is biased downwardly by the second spring 230. A communicating aperture 236 is defined on a bottom end of the cylinder portion 234 and the communicating aperture 236 is closed by the valve ball 232. Accordingly, the cylinder portion 234 of the upper casing 210, the valve-ball 232, the second spring 230 and the valve-lid 226 comprise a check-valve mechanism 23. In FIG. 3, the check-valve mechanism 23 does not allow communication between the outside of the valve casing 200 and the inside of the valve casing 200 through the communicating aperture 236.

Further, the end 542 of the connecting pipe 540 is located under the cap portion 570 of the lid 500 and the connecting pipe 540 penetrates the lid 500. When the lid 500 and the valve assembly 20 are assembled to the fuel tank 100, the end 542 of the connecting pipe 540 is located at a side of the valve casing 200 which is opposite the cylinder portion 234, and extends beyond the groove 218 of the upper casing 210. Thus, the check-valve mechanism 23 is separated from the end 542 of the connecting pipe 540.

The seal means 400 is sandwiched between the round projection 102 of the fuel tank 100, the ring member 140, the top plate 212 of the upper casing 210 and the lid 500, such that the chamber, defined under the cup portion 570 of the lid 500, is sealed by the sealing means 400 and the inside of the fuel tank 100 communicates with the charcoal canister through the valve assembly 20 and the connecting pipe 540.

A peripheral edge of the top plate 212 of the upper casing 210 projects perpendicularly from the arch-shape side wall 213 and is mounted on the round projection 102 of the fuel tank 100. The arch-shaped side wall 213 of the upper casing 210 is inserted into the arch-shaped opening 104 of the round projection 102 and projects downwardly within the fuel tank 100.

In FIG. 3, the fuel tank 100 is not filled up by fuel 10 and the surface of the fuel 10 does not reach the bottom casing 250 of the valve assembly 20. Accordingly, the valve body 300 is positioned at a lower position against the force of the first spring 280, such that a tip 310 of the valve body 300 is located apart from an under surface of the top plate 212. The top plate 212 includes a communicating aperture 222 which corresponds to the tip 310 of the valve body 300. The valve body 300 includes a lower recess and a center lower projection 350. The lower recess is defined within a bottom surface 322 of the valve body 300 and the upper end of the first spring 280 surrounds the center lower projection 350.

Figure 8:
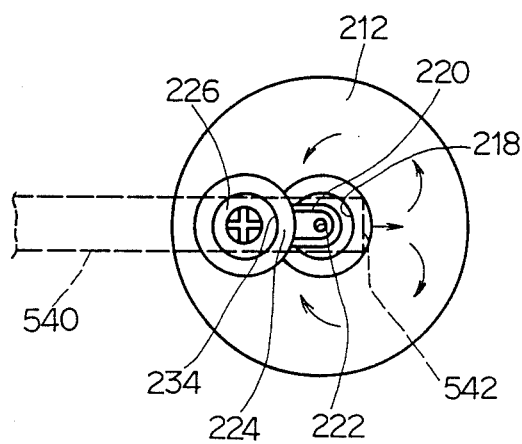
FIG. 8 is an enlarged top view of the upper casing as viewed from an arrow VIII in FIG. 3, wherein a location of a connecting pipe is represented by the broken line.

As shown in FIG. 8, the connecting pipe 540 crosses over the cylinder portion 234 and the communicating aperture 222, and the end 542 of the connecting pipe 540 is located over the groove 218. The dust preventing wall 220 surrounds the communicating aperture 222, and is secured to the top plate 212 of the valve casing 210. The dust preventing wall 220 is located between the communicating aperture 222 of the upper casing 210 and the end 542 of the connecting pipe 540. Accordingly, air, introduced from the atmosphere through the connecting pipe 540, cannot enter directly into the communicating aperture 222 of the upper casing 210 because the dust preventing wall 220 prevents direct air flow from the atmosphere.

The groove 218 partially surrounds the dust preventing wall 220 and the dust preventing wall 220 is connected to the dust preventing wall 224 which defines the outer side of the cylinder portion 234. The dust preventing wall 224 is higher than the dust preventing wall 220, so that the second dust preventing wall 224 can more effectively prevent minute dust particles and water vapor from being introduced into the cylinder portion 234 of the upper casing 210.

As shown in FIG. 3, the valve body 300 allows communication between the inside and outside of the fuel tank 100 through the communicating aperture 222. Further, the communicating apertures 216 and 252 allow communication between the inside of the valve casing 200 and the inside of the fuel tank 100.

Figure 6:
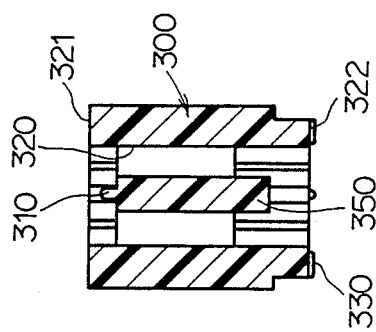
FIG. 6 is an enlarged cross-sectional view of the valve body taken along the line IV—IV in FIG. 2.
Figure 5:
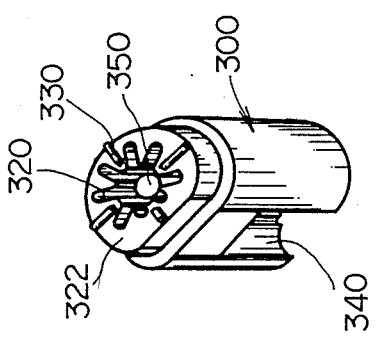
FIG. 5 is an enlarged perspective view of the valve body as viewed from an arrow V in FIG. 2.

As shown in FIGS. 2, 5 and 6, the valve body 300 includes a plurality of inner passages 320, a plurality of bottom projections 330, a side recess 340 and the center lower projection 350. The valve body 300 has an arch-cross-sectional-shape which corresponds to the arch-shape side wall 213 of the upper casing 210. An upper surface 321 communicates with the bottom surface 322 of the valve body 300 through the plurality of inner passages 320, the plurality of inner passages 320 are located around the tip 310 and the center lower projection 350 of the valve body 300. An upper recess is defined within the upper surface 321 of the valve body 300 and the tip 310 is located at a center of the upper recess. The plurality of inner passages 320 are enlarged radially from the tip 310 and the center lower projection 350. The plurality of bottom projections 330 extend downwardly from the bottom surface 322. When the valve body 300 is positioned at the lower position, the plurality of bottom projections 330 defines an interval between the bottom surface 322 of the valve body 300 and the bottom casing 250.

The side recess 340 is defined on a side surface of the valve body 300, and when the valve body 300 is assembled within the valve casing 200, the side recess 340 accepts the cylinder portion 234 of the upper casing 210, as shown in FIG. 3. The side recess 340 is connected to the upper recess of the valve body 300. As shown in FIG. 3, when the valve body 300 is located at the lower position, a long interval is defined between a bottom surface of the cylinder portion 234 and an upper surface of the side recess 340. Accordingly, even when the valve body 300 is positioned at an upper position, the upper surface of side recess 340 does not contact with the bottom surface of the cylinder portion 234.

Further, as shown in FIG. 3, the first spring 280 is located between the bottom casing 250 and the valve body 300. The center lower projection 350 of the valve body 300 is inserted into a cylinder defined by the first spring 280 from an upper end of the cylinder and the center projection 254 of the bottom casing 250 is inserted into the cylinder defined the first spring 280 from a bottom end of the cylinder. Accordingly, the first spring 280 is located securely between the valve body 300 and the bottom casing 250.

Figure 7:
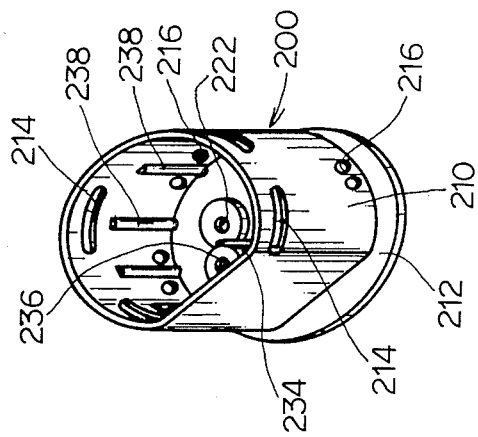
FIG. 7 is an enlarged perspective view of an upper casing of the fuel cut off valve assembly as viewed from an arrow VII in FIG. 2.

As shown in FIGS. 3 and 7, the upper casing 210 includes a plurality of longitudinal inner projections 238 which extend in the longitudinal direction of the upper casing 210. The plurality of longitudinal inner projections 238 are secured to an inner surface of the arch-shape side wall 213 of the upper casing 210. Accordingly, the longitudinal inner projections 238 define an interval between the valve body 300 and the arch-shape side wall 213 of the upper casing 210, such that the valve body 300 is slidably mounted on the longitudinal inner projections 238 of the upper casing 210.

Further, as shown in FIGS. 3 and 4, the round projection 102 of the fuel tank 100 is reinforced with a reinforcement member 120.

Figure 9:
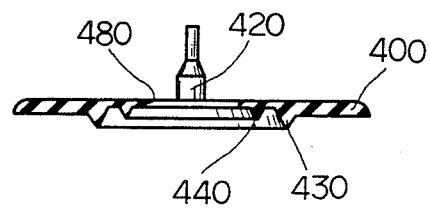
FIG. 9 is an enlarged cross-sectional view of a seal means taken along the line IX—IX in FIG. 2.

Furthermore, as shown in FIG. 9, the seal means 400 includes an outer lip 430 and an inner lip 440 around the opening 480. The outer lip 430 is separated from the inner lip 440, and when the seal member 400 is assembled to the valve casing 200, the inner lip 440 is positioned on the top plate 212 of the upper casing 210 and the outer lip 430 is positioned on the round projection 102 of the fuel tank 100. Accordingly, the seal means 400 provides an effective seal between the lid 500 and the fuel tank 100.

The operation of the valve assembly 20 is disclosed hereinafter.

As shown in FIG. 3, when the fuel tank 100 is not filled up (i.e., the surface of the fuel 10 does not reach a bottom of the valve casing 200), the valve body 300 is positioned at the lower position, such that the valve body 300 allows communication between the inside of the fuel tank 100 and the outside of the fuel tank 100 through the charcoal canister, the connecting pipe 540 and the communicating apertures 216, 252 and 222. Accordingly, even when the fuel 10 is vaporized within the fuel tank 100, the fuel vapor is introduced into the charcoal canister through the connecting pipe 540 and the communicating apertures 216, 252 and 222.

In this condition, when the high depression is caused within the fuel tank 100, (i.e. when fuel tank pressure becomes significantly lower than atmospheric pressure) the atmosphere is introduced through the charcoal canister, the connecting pipe 540 and the communicating apertures 216, 252 and 222.

However, the air, introduced from the outside of the fuel tank 100 through the connecting pipe 540, cannot enter directly into the communicating aperture 222, because the dust preventing wall 220 prevents the air from being introduced directly into the fuel tank 100 and the end 542 of the connecting pipe 540 crosses over the communicating aperture 222. Further, the end 542 of the connecting pipe 540 is located apart from the communicating aperture 222 of the upper casing 210.

As shown by arrows in FIGS. 3 and 8, the air flowing out from the connecting pipe 540, hits the top plate 212 of the upper casing 210 and turns along the top plate 212. The dust preventing wall 220 prevents the air from entering directly into the communicating aperture 222.

Accordingly, even when the air includes minute dust particles and water vapor, the dust preventing wall 220 can prevent most of the minute dust particles and water vapor from entering into the communicating aperture 222 because the air hits the dust preventing wall 220. As a result, most of the minute dust particles and water vapor are trapped within the groove 218.

Figure 10:
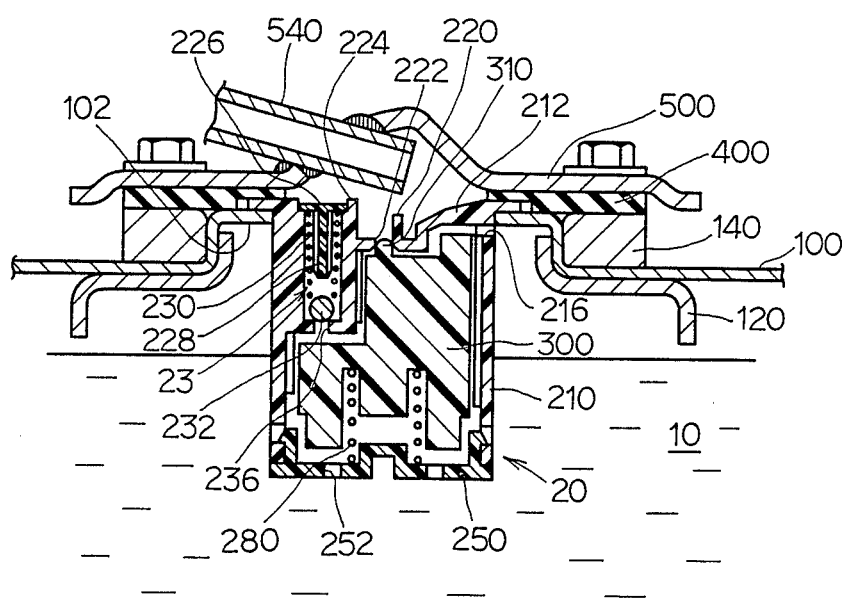
FIG. 10 is an enlarged cross-sectional view of the fuel cut off valve taken along the line III—III in FIG. 1, wherein the valve body is positioned at an upper position and the check valve mechanism is closed.

On the other hand, as shown in FIG. 10, when the fuel tank 100 is almost filled up (i.e., the surface of the fuel 10 reaches the upper casing 210), the valve body 300 is positioned at the upper position, because of the bias force of the first spring 280 and the buoyant force of the valve body 300. Accordingly, the valve body 300 does not allow communication between the inside and the outside of the fuel tank 100 through the communicating aperture 222 which is closed by the tip 310 of the valve body 300. Further, the valve body 300 can prevent the fuel 10 from flowing out through the communicating aperture 222 of the valve assembly 20.

Figure 11:
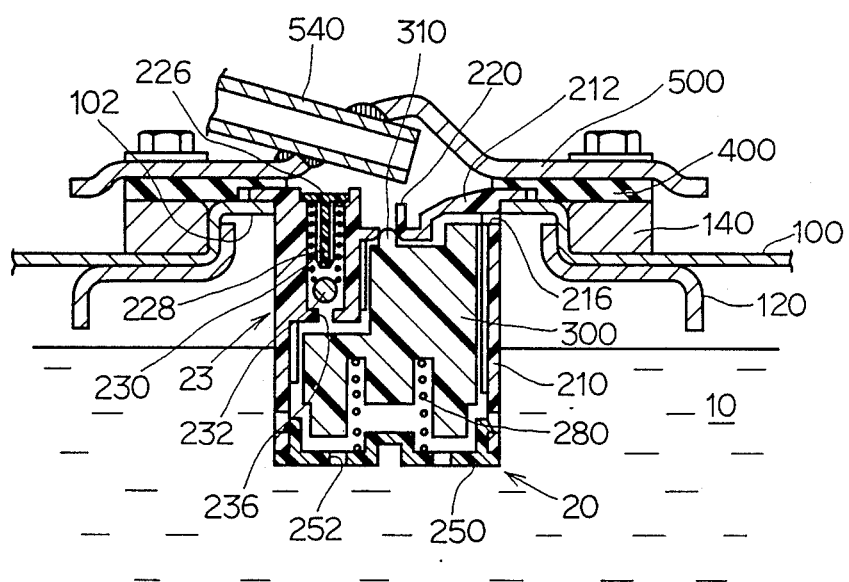
FIG. 11 is an enlarged cross-sectional view of the fuel cut off valve taken along the line III—III in FIG. 1, wherein the valve body is positioned at the upper position and the check valve mechanism is opened.

As shown in FIG. 11, when the fuel 10 is vaporized within the fuel tank 100 and when the pressure becomes high, the valve ball 232 of the check valve mechanism 23 is displaced to a second upper position against the bias force of the second spring 230 by the pressure of the fuel tank 100.

Accordingly, the communicating aperture 236 is opened and the check valve mechanism 23 allows communication between the inside of the fuel tank 100 and the outside of the fuel tank 100 through the charcoal canister, the connecting pipe 540 and the communicating apertures 216 and 236. As a result, the fuel vapor is introduced into the charcoal canister through the connecting pipe 540 and the communicating apertures 216 and 236.

In this condition, the projection 228 of the valve-lid 226 prevents the valve ball 232 from being displaced beyond a predetermined level, and regulates the degree of opening of the check valve mechanism 23.

When the valve body 300 is positioned at the upper position, and the valve ball 232 is positioned at the lower position, as shown in FIG. 10, and high depression is caused within the fuel tank 100, the valve body 300 is pushed slightly downwardly by the atmospheric pressure, and the atmosphere may be introduced into the fuel tank 100 through the communicating aperture 222 of the upper casing 210.

Figure 12:
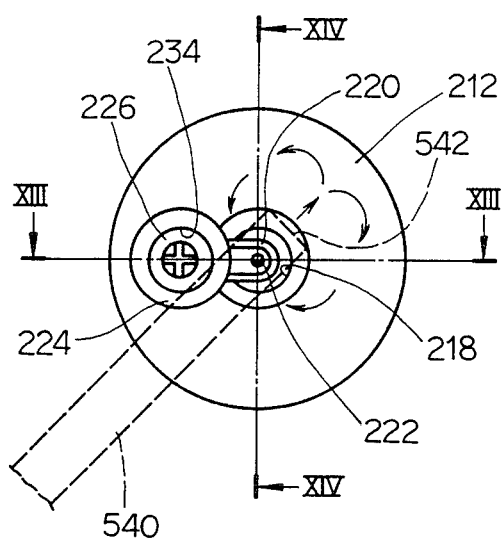
FIG. 12 is an enlarged top view of an upper casing of a second embodiment, wherein a location of a connecting pipe is represented by the broken line.
Figure 13:
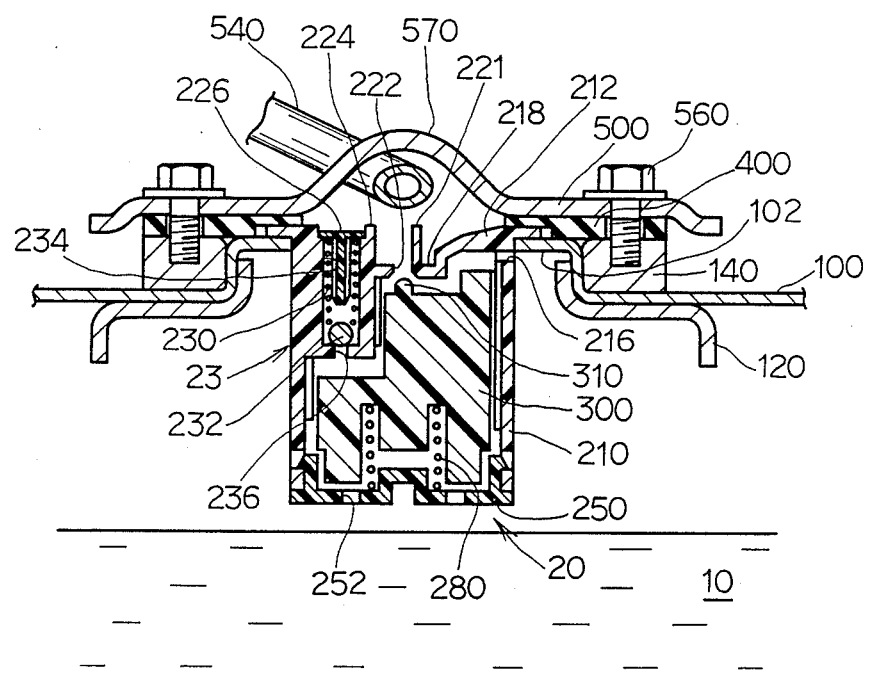
FIG. 13 is an enlarged cross-sectional view of a fuel cut off valve of the second embodiment taken along the line XIII—XIII in FIG. 12.
Figure 14:
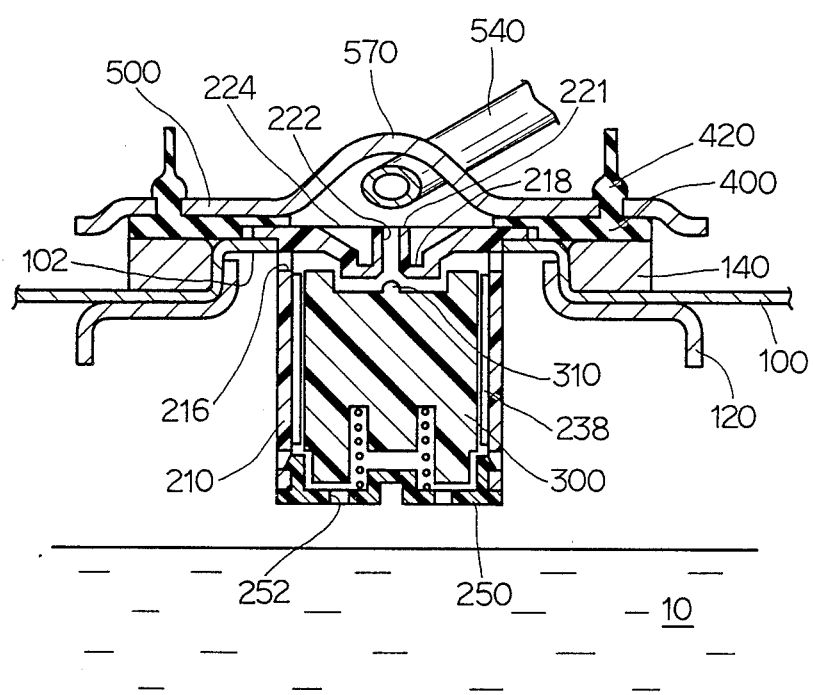
FIG. 14 is an enlarged cross-sectional view of the fuel cut off valve of the second embodiment taken along the line XIV—XIV in FIG. 12.

FIGS. 12 through 14 show a second embodiment of a valve assembly 20 which is secured to a fuel tank 100. The second embodiment is substantially similar to the first embodiment disclosed in FIGS. 1 through 11. However, in contrast to the first embodiment as illustrated in FIG. 8, the connecting pipe 540 is inclined at an angle of 45° from a line connecting a communicating aperture 222 to a cylinder portion 234, as shown in FIG. 12. Further, in contrast to the first embodiment as illustrated in FIGS. 3 and 4, a dust preventing wall 221 of the same height as the dust preventing wall 224 is provided as shown in FIGS. 13 and 14.

Accordingly, the dust preventing wall 221 of the second embodiment is higher than the dust preventing wall 220 of the first embodiment, such that the dust preventing wall 221 can prevent more effectively the introduction of minute dust particles and water vapor into the fuel tank 100.

Figure 18:
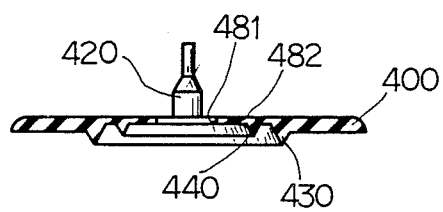
FIG. 18 is an enlarged cross-sectional view of the seal means of the third embodiment taken along the line XVIII—XVIII in FIG. 17.

FIGS. 15 through 18 show a third embodiment of a valve assembly 20 which is secured to a fuel tank 100. The third embodiment is substantially similar to the first embodiment disclosed in FIGS. 1 through 11. However in contrast to the first embodiment as illustrated in FIG. 9, the third embodiment include a seal means 400 which has an inner extension 482 as shown in FIG. 18.

Figure 15:
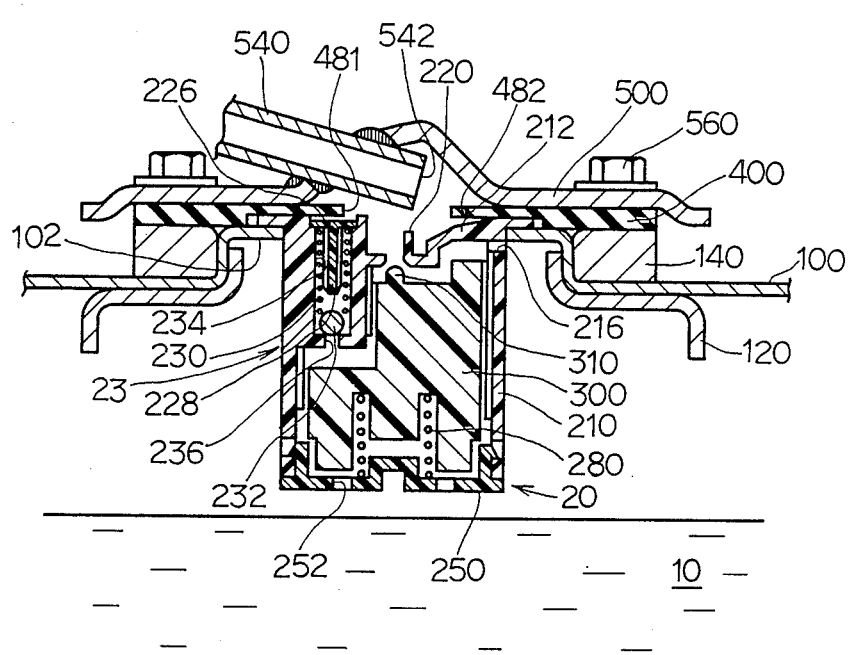
FIG. 15 is an enlarged cross-sectional view of a fuel cut off valve of a third embodiment taken along the line III—III in FIG. 1.
Figure 16:
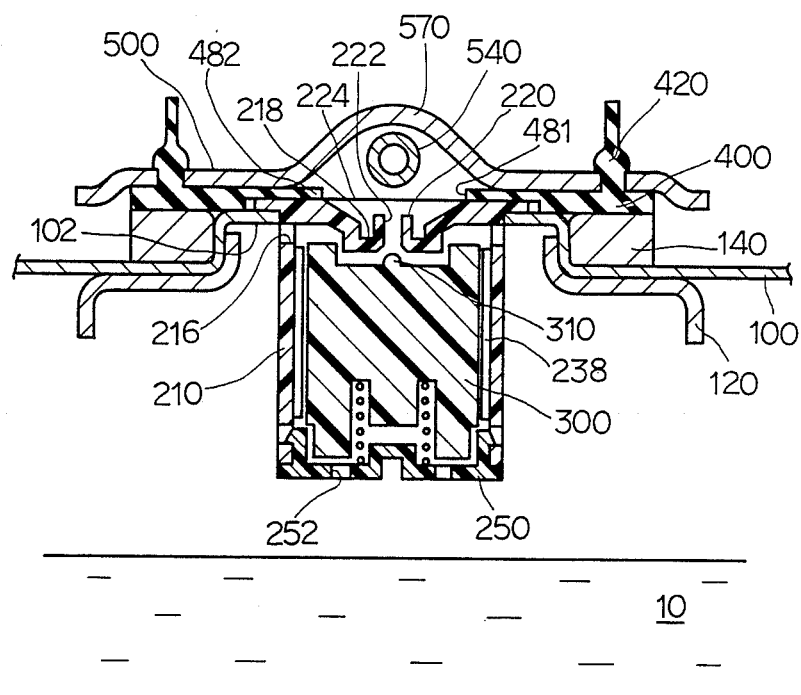
FIG. 16 is an enlarged cross-sectional view of the fuel cut off valve of the third embodiment taken along the line IV—IV in FIG. 1.
Figure 17:
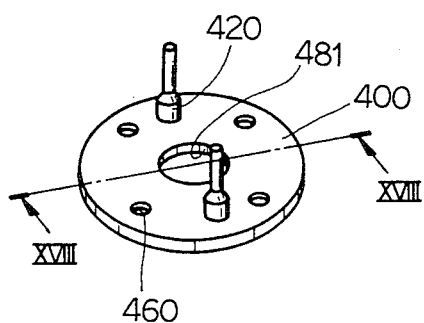
FIG. 17 is an enlarged perspective view of a seal means of the third embodiment.

Accordingly, as shown in FIG. 15, an opening 481 of the seal means 400 is located over a cylinder portion 234 of an upper casing 210, and the inner extension 482 of the seal means 400 covers more than half of the cylinder portion 234.

Therefore, the inner extension 482 of the seal means 400 can prevent more effectively the introduction of minute dust particles and the water vapor into the cylinder portion 234 of the upper casing 210.

As described herein, the present invention overcomes the shortcomings of the known art by providing a valve assembly which can prevent the introduction of minute dust particles and water vapor into a fuel tank.

While the present invention has been described in its preferred embodiments, it is to be understood that the invention is not limited thereto, and may be otherwise embodied within the scope of the following claims.

What is claimed is:

1. A valve assembly for use in a fuel tank of a vehicle, the valve assembly comprising:

a first valve means comprising a valve casing and a valve body, said valve casing being mounted on said fuel tank, said valve casing having a first aperture, said valve body being located within said valve casing, said valve body being positioned selectively at one of a first position and a second position, said first aperture selectively allowing communication between the inside of said valve body and the outside of said fuel tank, such that when the valve body is at the first position, said valve body is apart from said first aperture, such that the first valve means allows communication between the inside of said valve casing and the outside of said fuel tank through said first aperture, and when said valve body is at the second position, said valve body covers said first aperture, such that said first aperture is closed, said first valve means further including a second aperture and a third aperture, said second aperture being opened at an upper portion of said valve casing, said third aperture being opened at a lower portion of said valve casing, whereby when fuel within the tank is below the third aperture of the valve casing, the valve body is in said first position, and the first valve means allows communication between the inside of said fuel tank and an inside of said valve casing through both of said second and third apertures of the valve casing and when said valve body is in said second position, the first valve means allows communication between the inside of said fuel tank and the inside of said valve casing through said second aperture of the valve casing, such that regardless of the position of said valve body and the fuel, the first valve means allows communication between the inside of said fuel tank and the inside of said valve casing through at least said second aperture;

a dust preventing means secured to an outer surface of said valve casing, the dust preventing means having a wall member and a groove, the wall member being located proximate said first aperture of said valve casing, said groove being defined around said wall member;

whereby when air flows from the outside of said fuel tank to the inside of said fuel tank, the air hits the wall member of said dust preventing means, thereby forcing air to travel around the wall member, such that the dust preventing means substantially prevents the introduction of minute dust particles into the inside of said fuel tank;

a lid member having a pipe member, said lid member mounted on the fuel tank, the lid member covering said first valve means, an end of said pipe member being located under said lid member, said lid member being located apart from said first valve means, a space being defined between said lid member and said first valve means, said pipe member allowing communication between the atmosphere and said space, said end of said pipe member being located apart from said first aperture of said valve casing, said dust preventing means being located between said end of said pipe member and said first aperture of the valve casing, whereby said dust preventing means prevents smooth communication between said pipe member and said first aperture of the valve casing, said groove collecting dust therewithin; and a seal means located between said lid member and said valve casing and between said lid member and said fuel tank, the seal means having an opening, the opening allowing communication between said pipe member and said valve casing, the seal means including a thick portion and a thin portion, the thick portion of the seal means providing a seal between the fuel tank and said lid member, the thin portion of the seal means providing a seal between the valve casing and said lid member, whereby the seal means can prevent the introduction of minute dust between said fuel tank, said lid member and said valve casing.

2. The valve assembly of claim 1, further comprising a second valve means having bias means, a second valve body and a cylinder portion, said cylinder portion being defined within said valve casing, said cylinder portion having a fourth aperture, said fourth aperture allowing communication between the inside of said valve casing and the outside of said fuel tank, the second valve body selectively closing the fourth aperture of the cylinder portion, the bias means biasing said second valve body toward said fourth aperture of said cylinder portion, said second valve body and said bias means being located inside of said valve casing, the second valve body being selectively positioned at one of a first position and a second position, whereby when said second valve body is positioned at said first position, said second valve body covers the fourth aperture of said valve casing, such that the second valve means prevents communication through said fourth aperture between the inside of said valve casing and the outside of said fuel tank, and when said second valve body is positioned at said second position, said second valve body is located apart from the fourth aperture of the second valve casing, such that the second valve means allows communication between the inside of the valve casing and the outside of the fuel tank through said fourth aperture.

3. The valve assembly of claim 2, further comprising a second dust preventing means secured to said outer surface of said valve casing, said second dust preventing means having a second wall member, said second wall member being located proximate said cylinder portion, whereby when air is introduced from outside of the fuel tank, the air hits said second wall member of said second dust preventing means thereby forcing the air to travel around said second wall member, such that said second dust preventing means substantially prevents the introduction of minute dust particles into said cylinder portion of said valve casing.

4. The valve assembly of claim 3, further comprising a third dust preventing means located on said valve casing, said third dust preventing means covering a portion of said cylinder portion of said valve casing.

5. A valve assembly for use in a fuel tank of a vehicle, the valve assembly comprising:

first and second valve means and a valve casing, said first valve means comprising bias means and a first valve body, said valve casing being mounted on the fuel tank, said valve casing having a cylinder portion and a first aperture, said first valve body being located within said cylinder portion, said first aperture being defined within said cylinder portion, said cylinder portion being defined within said valve casing, said first aperture allowing communication between the inside of said valve casing and the outside of said fuel tank, the first valve body closing selectively said first aperture of said cylinder portion, said bias means biasing said first valve body toward said first aperture of said cylinder portion, said first valve body and said first bias means being located at a first side of said valve casing, said first valve body being positioned selectively at one of a first position and second position, whereby when first valve body is positioned at said first position, said first valve body covers said first aperture, such that said first valve means prevents communication through said first aperture, and when first valve body is positioned at said second position, said first valve body is located apart from said first aperture, such that the first valve means allows communication between the inside of said valve casing and the outside of said fuel tank through said first aperture said second valve means comprising a second valve body, a second aperture and a third aperture, said second aperture being opened at an upper portion of said valve casing, said third aperture being opened at a lower portion of said valve casing, said second valve body being movable between a first position and a second position, whereby when fuel within the tank is below the third aperture of the valve casing, the second valve body is in said first position and the inside of said fuel tank communicates with an inside of said valve casing through both of said second and third apertures of the valve casing, and when the second valve body is in said second position, the inside of said fuel tank communicates with the inside of said valve casing through said second aperture of the valve casing, such that regardless of the position of said valve body and the fuel, communication between the inside of said fuel tank and the inside of the valve casing is ensured, said valve casing further comprising a fourth aperture, said second valve body being located within said valve casing, said fourth aperture allowing, selectively, communication between the inside of said valve casing and the outside of said fuel tank, whereby when said second valve body is positioned at said first position, the second valve body is positioned apart from said fourth aperture, such that said second valve means allows communication between the inside of said fuel tank and the outside of said fuel tank through said fourth aperture of said valve casing, and when said second valve body is positioned at said second position, said second valve body covers said fourth aperture of said valve casing such that said second valve means prevents communication through said fourth aperture;

a first dust preventing means secured to an outer surface of said valve casing, said first dust preventing means having a wall member and a groove, said wall member being located proximate said fourth aperture, said groove being defined around said wall member, whereby when air flows from the outside of said fuel tank to the inside of said fuel tank, the air hits said wall member of said dust preventing means, thereby forcing the air to travel around the wall member, such that said first dust preventing means substantially prevents the introduction of minute dust particles into the inside of said fuel tank;

a lid member having a pipe member, said lid member mounted on the fuel tank, the lid member covering said first and second valve means, an end of said pipe member being located under said lid member, said lid member being located apart from said second valve means, a space being defined between said lid member and said second valve means, said pipe member allowing communication between the atmosphere and said space, said end of said pipe member being located apart from said fourth aperture of said valve casing, said dust preventing means being located between said end of said pipe member and said fourth aperture of the valve casing, whereby said dust preventing means prevents smooth communication between said pipe member and said first and fourth apertures of the valve casing, said groove collecting dust therewithin; and a seal means located between said lid member and said valve casing and between said lid member and said fuel tank, the seal means having an opening, the opening allowing communication between said pipe member and said valve casing, the seal means including a thick portion and a thin portion, the thick portion of the seal means providing a seal between the fuel tank and said lid member, the thin portion of the seal means providing a seal between the valve casing and said lid member, whereby the seal means can prevent the introduction of minute dust between said fuel tank, said lid member and said valve casing.

6. The valve assembly of claim 5, further comprising, a second dust preventing means secured to said outer surface of said valve casing, said second dust preventing means having a second wall member, said second wall member being located proximate said first aperture of said valve casing, whereby when air flows from the outside of said fuel tank to the inside of said fuel tank, the air hits said second wall member of said second dust preventing means thus forcing the air to travel around said second wall member, such that said second dust preventing means substantially prevents the introduction of minute dust particles into the inside of said fuel tank.

7. The valve assembly of claim 6, wherein said second wall member of said second dust preventing means has the same height as said wall member of said first dust preventing means.

8. The valve assembly of claim 6, further comprising a third dust preventing means located on said valve casing, said third dust preventing means covering a portion of said cylinder portion of said valve casing.

9. A valve assembly for use in a fuel tank of a vehicle, the valve assembly comprising:

a first valve means having a valve casing, bias means and a first valve body, said valve casing being mounted on said fuel tank, said valve casing having a cylinder portion and a first aperture, said first valve body being located within said cylinder portion, said first aperture being defined within said cylinder portion, said cylinder portion being defined by said valve casing, said first aperture allowing communication between the inside of said valve casing and the outside of said fuel tank, the first valve body selectively closing said first aperture of said cylinder portion, said bias means biasing said first valve body toward said first aperture of said cylinder portion, said first valve body and said bias means being located at a first side of said valve casing, said first valve body being selectively positioned at one of a first position and a second position, whereby when said first valve body is at the first position, said first valve body covers said first aperture, such that said first valve means prevents communication through said first aperture, and when said first valve body is positioned at the second position, said first valve body is located apart from said first aperture, such that said first valve means allows communication between the inside of said valve casing and the outside of said fuel tank through said first aperture;

a second valve means comprising a second valve body, a second aperture and a third aperture, said second aperture being opened at an upper portion of said valve casing, said third aperture being opened at a lower portion of said valve casing, said second valve body being movable between a first position and a second position, whereby when fuel within the tank is below the third aperture of the valve casing, the second valve body is in said first position and the inside of said fuel tank communicates with an inside of said valve casing through both of said second and third apertures of the valve casing and when the second valve body is in said second position, the inside of said fuel tank communicates with the inside of said valve casing through said second aperture of the valve casing, such that regardless of the position of said valve body and the fuel, communication between the inside of said fuel tank and the inside of the valve casing is ensured, said valve casing further comprising a fourth aperture, said second valve body being located within said valve casing, said fourth aperture allowing, selectively, communication between the inside of said valve casing and the outside of said fuel tank, whereby when said second valve body is positioned at said first position, the second valve body is positioned apart from said fourth aperture, such that said second valve means allows communication between the inside of said fuel tank and the outside of said fuel tank through said fourth aperture of said valve casing, and when said second valve body is positioned at said second position, said second valve body covers said fourth aperture of said valve casing such that said second valve means prevents communication through said fourth aperture;

a first dust preventing means secured to an outer surface of said valve casing, said first dust preventing means having a wall member, said wall member being located proximate said fourth aperture of said valve casing, whereby when air flows from the outside of said fuel tank to the inside of said fuel tank, the air hits said wall member of said first dust preventing means, thus forcing the air to travel around the wall member, such that said first dust preventing means substantially prevents the introduction of minute dust particles into the inside of said fuel tank;

a lid member having a pipe member, said lid member mounted on the fuel tank, the lid member covering said first valve means, an end of said pipe member being located under said lid member, said lid member being located apart from said first valve means, a space being defined between said lid member and said first valve means, said pipe member allowing communication between the atmosphere and said space, said end of said pipe member being located apart from said first aperture of said valve casing, said dust preventing means being located between said end of said pipe member and said first aperture of the valve casing, whereby said dust preventing means prevents smooth communication between said pipe member and said first aperture of the valve casing, said groove collecting dust therewithin;

a seal means located between said lid member and said valve casing and between said lid member and said fuel tank, the seal means having an opening, the opening allowing communication between said pipe member and said valve casing, the seal means including a thick portion and a thin portion, the thick portion of the seal means providing a seal between the fuel tank and said lid member, the thin portion of the seal means providing a seal between the valve casing and said lid member, whereby the seal means can prevent the introduction of minute dust between said fuel tank, said lid member and said valve casing; and a second dust preventing means located on said valve casing, the second dust preventing means covering a portion of said cylinder portion of said valve casing.

10. The valve assembly of claim 9, wherein said second dust preventing means comprises a seal portion located between the fuel tank and the lid member, the seal portion having an opening, the opening allowing communication between said pipe member and said valve casing.

11. The valve assembly of claim 9, further comprising, a third dust preventing means secured to an outer surface of said valve casing of said valve means, said third dust preventing means having a second wall member, said second wall member being located proximate the fourth aperture of said valve casing, whereby when air flows from the outside of said fuel tank to the inside of said fuel tank, the air hits said second wall member of said third dust preventing means thereby forcing the air to travel around said second wall member, such that said third dust preventing means substantially prevents the introduction of minute dust particles into the inside of said fuel tank.

12. The valve assembly of claim 11, wherein said second wall member of said third dust preventing means has the same height as said wall member of said first dust preventing means.

* * * * *